Oct. 21, 1952    G. DION    2,615,130
ELECTRON TUBE WITH MOVABLE ELECTRODE
Filed Nov. 20, 1947
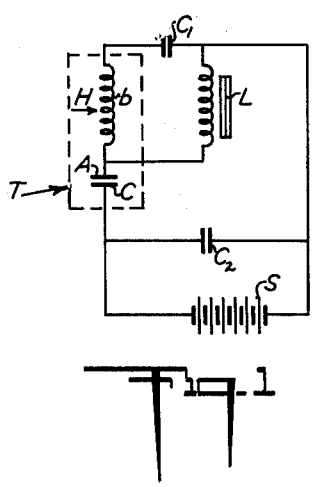
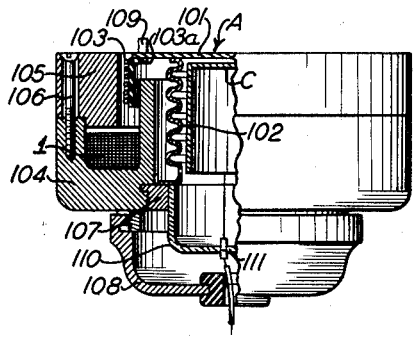
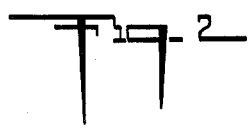
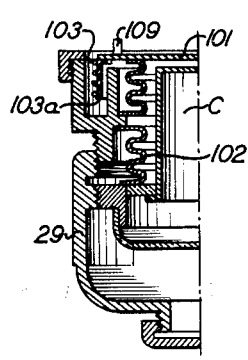
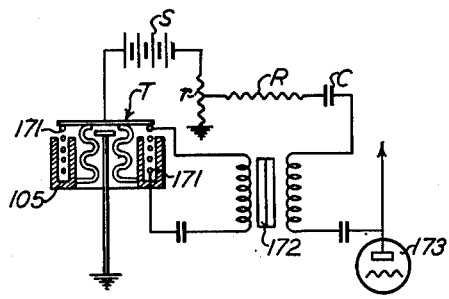
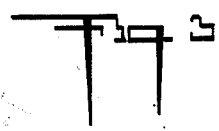
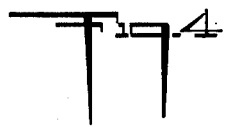
INVENTOR
*GEORGES DION*
BY *Haseltine Lake and Co,*
AGENTS Patented Oct. 21, 1952

2,615,130

UNITED STATES PATENT OFFICE 2,615,130

ELECTRON TUBE WITH MOVABLE ELECTRODE

Georges Dion, Paris, France

Application November 20, 1947, Serial No. 787,156
In France November 28, 1946

3 Claims. (Cl. 250—27)

The indication of small variations in pressure of any origin whatever is provided nowadays through the agency of mechanical, pneumatic or electric systems. Generally amplification is obtained through electronic means of an original electric phenomenon that is directly connected to the movement to be detected, the transformation of said movement into an electric phenomenon being obtained through the agency of systems making use of variations in resistance, conductivity, capacity or inductance.

My invention has for its object to avoid such intermediate steps and allows the movement to act directly on an electronic system.

To this purpose and according to my invention, certain elements of the electronic system are arranged in a manner such as to be capable of displacement through mechanical connection with one or more diaphragms submitted to variations in pressure or any like members receiving movements of small amplitude, said variations in position of the elements of the electronic system generating variations in voltage across the terminals allowing a measure of said variations in pressure.

Preferably, the movable elements of the electronic system are arranged in a manner such as to produce a variation in the spacing between two electrodes.

According to a first form of execution of the invention, I make use of the property offered by the current of a diode of varying as a function of the reciprocal of the square of the distance separating the electrodes as per the formula:

$$I = \frac{CU^{3/2}}{a^2}$$

wherein C is a constant, U the voltage between the electrodes, $a$ the distance between same. This characteristic property is due to the presence of the spatial load.

All other conditions remaining the same, it is therefore apparent that if for instance the anode is constrained to follow the movement to be detected, such a tube fed with constant voltage through a resistance of predetermined value will show an operating voltage across the terminal of its electrodes that follows by reason of the preceding formula the variations in distance between the latter.

Accompanying drawings show by way of example and by no means in a limiting sense some preferred forms of my invention.

In said drawings:

Fig. 1 shows a preferred form of execution.

Fig. 2 shows an electronic tube associated with an electrodynamic coil.

Fig. 3 illustrates a modification adapted to be used as a microphone.

Fig. 4 is a modification of Fig. 1.

Fig. 1 illustrates a possible wiring diagram; T designates a tube of which A is the anode constituted by a membrane mechanically connected with an electro dynamic coil $b$ that may move inside a magnetic field H produced either by a permanent magnet or by an electromagnet. This coil may be fed by the current produced by the variations in the electrode spacing and passing through the condenser C1. An induction coil of high value L allows the passage of direct current while it is inoperative during the rapid variations in current intensity. A condenser C2 is connected across the source of current S so as to allow the passage of the rapid variations in current.

In all applications that are intended to detect mechanical phenomena or to obtain an amplification in energy, it is necessary to produce a variation as important as possible of the grid voltage in the case of three electrode tubes. This result may be reached only with mechanical arrangements adapted to produce an important transformation of movements producing substantial modifications in resistance, capacity or self inductance. Such arrangements lead either to an important mechanical consumption of mechanical energy or to the use of compound electronic systems.

One of the advantages of the invention resides in the fact that in order to produce inside an anode circuit a comparatively important variation in energy for a comparatively small modification of the electrode spacing and consequently for an expense of mechanical energy that is less than with the usual systems. This result is due on one hand to the property of the anode current of varying as the reciprocal of the square of the electrode spacing and on the other hand to the small internal resistance of the tubes when compared to the slope and to the corresponding internal resistance of arrangements including an intermediary electrode such as a grid in a multi-electrode tube.

On the other hand, when using the reaction or counter-damping effect, it is not only possible to increase the energy transformation but also to execute with certain mechanical arrangements that per se have practically no energy that may be used from a mechanical stand-point, a positive feedback that allows said arrangements to produce directly a substantially more important energy.

Through application of the opposite counter-reaction or damping effect, it is possible to provide stability for mechanical systems that are through their very constitution of an instable character as is the case for systems producing mechanical resonance or distortion effects, that may thus be corrected.

Fig. 2 illustrates an electronic tube the anode A of which is constituted by the arrangement of the diaphragm 102 and of the cover 101, the cathode being shown at C. Said tube is associated with an electrodynamic coil: the cover 101 of the diaphragm 102 carries at its periphery a tube of insulating material 103a on which a winding of fine wire forms an electrodynamic coil 103 adapted to move inside the gap of an electromagnet constituted by a solid member 104 inside which is housed the feed coil 1. One end of this fine wire is directly connected to cover 101 while the other end is connected to an outlet terminal 109 whereby the tube may be connected to the circuit illustrated in Figure 1. The magnetic circuit is completed by a ring 105 secured to the member 104 through the agency of screws 106, 104 and 105 being made of magnetically permeable metal. The lower part of the electronic tube to which is secured a threaded ring 107 is permanently screwed inside the base of member 104. The casing 108 is secured to the lower part of the member 104 and protects the glass valve enclosing the tube through which extends a lead 111 which enables the cathode C to be connected to the outside circuit.

The operation is as follows:

The feed circuit of the coil 103 and that of the tube are in one. In other words, the coil 103 and the electrode gap are mounted in series. The coil 103 fed by the normal output when in inoperative conditions is submitted to an electrodynamic force due to its presence in the field of the electromagnet and balances the elastic reaction of the diaphragm. If the point of operation of the electronic tube is suitably selected it is apparent that for an initial displacement of small amplitude of the diaphragm that has a tendency to reduce the electrode spacing, the electronic current and consequently the electrodynamic attracting force will increase and have a tendency to still further reduce the electrode spacing which leads to an increase of the current intensity and of the electrodynamic force and so on. The action returning the diaphragm towards the cathode increases as it comes nearer the latter. In other words, the initial displacement of small amplitude corresponding for instance to the application of a small energy leads to a comparatively important displacement of the diaphragm and to the release of a comparatively important mechanical energy that is borrowed from the source of electric energy. There is thus obtained a true amplifier of mechanical energy.

Of course the movement considered is limited by the engagement with the upper part of 104 of the lower part of the diaphragm plate. Similarly any variation of small amplitude of the current fed by the tube will have for its action an increase of the electrodynamic stress exerted on the coil and, if said variation is provided in the proper direction, the result already described will be produced under the same conditions. There is thus obtained an electro-mechanical amplifier and more generally speaking in the two above described cases a substantial amplification of the current fed by the tube.

This latter form of execution is more particularly applicable to energy relays having a high sensitivity and a considerable speed of operation.

Lastly if the abutment may be made elastic so that the diaphragm after rebounding may return into the vicinity of its former position in a manner that is opposed to the preceding movement, a true electro-mechanical vibrator will have been produced without any breaking of the current through metal contact pieces while direct current is transformed in the anode circuit of the tube into alternating current energy that is more readily adapted for use.

Fig. 3 illustrates under a somewhat different form a typical application of the form of execution described hereinabove with the sole restriction that the phenomena applied correspond no longer to a permanent manner of operating but only to transient operation. To this purpose, only the variable or transient components of the current may energize the electrodynamic coil. As in the form of execution described hereinabove, the upper part of the diaphragm 101 carries an electrodynamic coil at 103 while its lower part may be constrained to assume displacements produced by the rotation of the casing 29, which displacements allow an initial adjustment of the electrode spacing.

This arrangement may be used either as a microphone of a high sensitivity for a privileged range of the acoustic spectrum through the use of a reaction effect that is predominant for the range considered, or else as a microphone for a wide band of frequencies if a counter-reaction effect is made use of under the following conditions:

The vibrating system being executed in a manner such that its own resonance frequency may be higher than the highest frequency to be transmitted, the absence of any counter-reaction corresponds to the privileged transmission of high frequencies as compared with the low frequencies that are much more damped. On the contrary, the application of a counter-reaction effect that is predominant towards the zone of high frequencies has for its action a levelling of the response curve of the microphone. This form of execution is made possible by the high sensitivity of the electronic tube which allows executing a transformation of energy that is still important in spite of the mechanical damping in said zone of the spectrum.

The transfer of the spectrum frequency to the outside of the spectrum transmitted has for its action an elimination of all linear distortion which would be produced by the different submultiple frequencies of an ordinary diaphragm.

On the other hand, if the electrodynamic coil is fed by means of periodical electrical phenomena, it is also possible to use the above disclosed arrangements and to constitute thereby a loudspeaker operating with counter-reaction and the response curve of which is substantially uniform. It will be noticed that by reason of the lower sensitivity towards the range of low frequencies and of the use of a counter-reaction effect for levelling the response curve, the power required for the energization of such a loud speaker should of necessity be higher than in conventional systems. However it should be remarked that the vibratory diaphragm in its upper flat portion ensures a radiation that corresponds to the effect of a theoretical piston and provides no radiation on its rear surface by reason of the vacuum provided inside the tube. Under such conditions, the interferences between the radiations from the front and rear surfaces of a diaphragm that lead as well known to a weakening of the low frequencies in conventional systems, are not to be considered in the present case.

Fig. 4 illustrates a mounting corresponding to a particular application of the tube with an electro-dynamic coil already described with reference to Fig. 1. This mounting is more particularly applicable to the execution of an electro acoustic transmission making use of a counter reaction effect. A tube T the diaphragm of which is provided with an electrodynamic coil 171 is inserted inside the gap of an electromagnet 105 and fed at acoustic frequency by a transformer 172 the primary of which is energized by a multi electrode tube 173 and said tube T expresses in its anode circuit and more particularly at the terminals of the resistance $r$ the variations in the electrode spacing arising through the movement of the coil 171. The connecting circuit RC feeds in series into the primary of the transformer a certain part of the voltage arising across the terminals of $r$ whereby a counter reaction effect is obtained that is more particularly marked for the frequency corresponding to the time constant of the connecting circuit.

The operation of such an arrangement has already been described hereinabove in a quite general manner. The frequencies of resonance of the diaphragm and of the coil are suitably selected so as to be shifted to the outside of the acoustic spectrum and used in a manner such that no resonance frequency corresponding to the submultiples of the frequencies of the diaphragm may deform the response curve. The increase of counter-reaction for high frequencies has for its result to return the acoustic level of these frequencies to the same value as that of the lower frequencies which latter are damped at the start by reason of the shifting of the resonance frequency towards the higher ranges of the spectrum.

An arrangement such as that disclosed may be used for infra or ultra acoustic applications and the counter-reaction effect may be replaced by a reaction effect more especially adapted to such a frequency that has been especially selected therefor.

What I claim is:

1. Electronic tube having a gastight enclosure comprising in combination, two electrodes located in the enclosure, at least one of said electrodes being movable relatively to the other, means traversing the enclosure wall and connected to an outside source and to the movable electrode for transmitting mechanical motion from the source to said movable electrode, means responsive to current flow for subjecting said movable electrode to non-mechanical actions and means controlling said current responsive means in accordance with the flow of electrons within the tube.

2. An electronic tube comprising two electrodes at least one of which is movable relatively to the other, mechanical means located outside the tube and connected to the movable electrode to impart mechanical motion thereto, electromagnetic means acting on the electrode in opposition to the action of said mechanical means, said electromagnetic means being fixed to the movable electrode and comprising a coil traversed by the current flowing through the tube and located in a magnetic field.

3. An electronic tube comprising two electrodes at least one of which is movable relatively to the other, mechanical means located outside the tube and connected to the movable electrode for imparting movement thereto, electromagnetic means acting on the movable electrode in opposition to said mechanical means, said electromagnetic means being fixed to the movable electrode and comprising a coil traversed by the current flowing through the tube, means for producing a magnetic field including the coil, and impedances inserted in the circuit of the coil.

GEORGES DION.

REFERENCES CITED

The following references are of record in the file of this patent:

UNITED STATES PATENTS

| Number | Name | Date |
| --- | --- | --- |
| Re. 21,458 | Linder | May 21, 1940 |
| 2,179,673 | Smith | Nov. 14, 1939 |
| 2,290,531 | Brett | July 21, 1942 |
| 2,339,289 | Olken | Jan. 18, 1944 |
| 2,348,177 | Keeler | May 2, 1944 |
| 2,389,935 | Rothstein | Nov. 27, 1945 |
| 2,392,370 | Esval et al. | Jan. 8, 1946 |
| 2,434,854 | Junkins et al. | Jan. 20, 1948 |
| 2,440,565 | Antalek | Apr. 27, 1948 |